J. C. Stoddard,
Hay Spreader.

No. 1042. Reissued. Sep. 11. 1860.

Witnesses:
Wm Tuch
R. S. Spencer

Inventor:
J. C. Stoddard

UNITED STATES PATENT OFFICE.

J. C. STODDARD, OF WORCESTER, MASSACHUSETTS.

IMPROVEMENT IN HAY-MAKING MACHINES.

Specification forming part of Letters Patent No. 26,380, dated December 6, 1859; Reissue No. 1,012, dated September 11, 1860.

*To all whom it may concern:*

Be it known that I, J. C. STODDARD, of Worcester, in the county of Worcester and State of Massachusetts, have invented certain new and useful Improvements in Machines for Making Hay; and I do hereby declare that the following is a full, clear, and exact description of the same, reference being had to the annexed drawings, making a part of this specification, in which—

Figure 1:
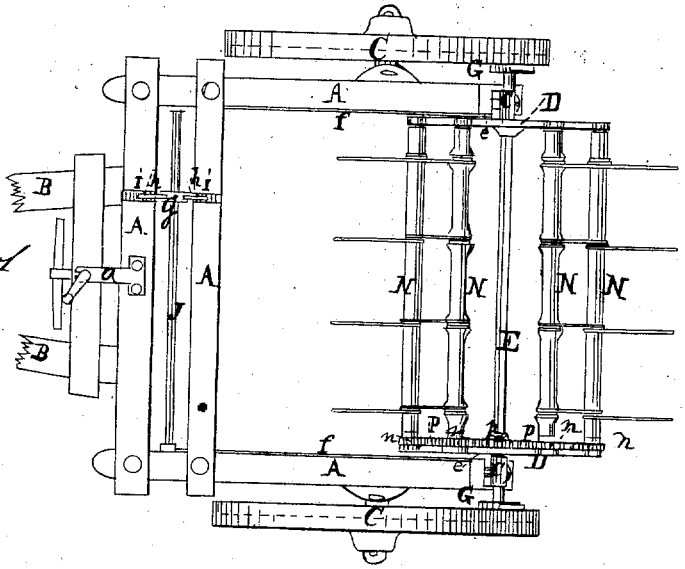
Figure 2:
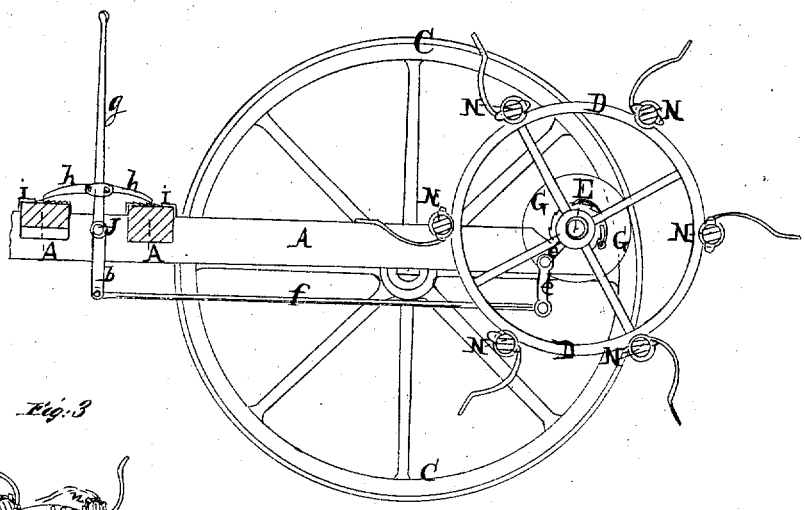
Figure 3:
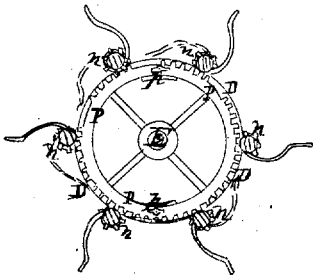

Figure 1 represents a plan view of my machine complete, with the exception of the thills, a portion of these being broken off. Fig. 2 is a vertical longitudinal section, looking toward the right-hand side of the machine, showing the reel of rakes and the manner of hanging the same. Fig. 3 is a transverse section taken through the reel, showing a manner of adjusting the teeth of the hay-spreaders simultaneously.

Similar letters of reference indicate corresponding parts in the several figures.

This invention relates to machines for making hay, or, in other words, for scattering and spreading the grass after it has been cut down, so as to thoroughly expose it to the action of the air and sun for drying and curing before it is raked and stacked up. The present devices for effecting this purpose are complex, clumsy, and heavy, and entirely unsuited for the purposes they are intended for, as practical experience has clearly proved both in this country and in Europe. The greatest difficulties which are to be surmounted in rendering this class of implements useful and economical are, first, adapting the machine to the inequalities of the ground to be passed over; second, adjusting the rakes while the machine is in motion and they are revolving so as to either throw them entirely above the fallen grass and out of the way of stumps, stones, and other like impediments, or to nicely regulate the dip of the rakes according to the bulk of grass to be elevated and scattered; third, to obtain great speed of the rakes without any liability of their clogging the machinery or entangling with the grass; and, lastly, to accomplish the thorough separation and scattering of the grass with a machine which is both light and strong, and which is not liable to get deranged, and when deranged can be easily repaired by an ordinary workman. It has been found by repeated experiments that cogged gearing will not answer the purpose of haymakers, not only from the fact that the teeth are liable to break off on account of the degree of speed necessary for the rakes, but the clogging up of gearing with grass and other substance, which cannot be prevented, renders the machine hard to manage, hard on the horses, and totally unsuited to the requirements of the farmer.

The object of my present invention is to remedy these objectionable points and to dispense altogether with cogged gearing for giving motion to the reel, and thereby effectively prevent the breaking of the tines or derangement of the machine when the tines come in contact with any obstructions and the rapid motion of the reel is suddenly checked, while at the same time with my device for giving motion to the reel there is no likelihood of the parts becoming choked up or entangled with the grass or hay. Besides, the driver can have full control over the reel of rakes and raise or depress them simultaneously, as occasion may require.

A A is a quadrangular frame, made of light but stout timber, to the front part of which is attached the thills B by a curved and slotted bar, *a*, into which slot plays a screw with a collar above and below the slot. The screw being turned by a crank will raise or depress the front part of the machine. This frame A A is mounted upon wheels C C, which are ordinary wooden wheels, but have their tires projecting over from the inner side of the circumference of the fellies, for purposes hereinafter stated. The wheels C C have short axles, which are secured to the side timbers of the frame by a suitable bolt, which serves as a pivot for swinging the wheels to one side in removing the reel and placing in its stead a rake. The axles may be fixed again in their natural positions by pins or bolts, as shown in the drawings, thus saving the trouble of removing the wheels from the axle.

The driver's seat is mounted in the front part of the frame in the usual manner, and the horse can be driven by a boy, as the machine can be operated by any one capable of driving a horse.

The rakes are arranged around the edge of two circular heads, D D, which are keyed securely to a reel-shaft, E, which passes transversely across the frame A A, its ends proceeding out a suitable distance beyond the sides of the frame and carrying friction-wheels G G, of wood or metal, wood being preferable. These friction-wheels G G are placed loosely upon the extreme ends of the shaft E, so that they will both turn in one direction (backward) upon the shaft; but in the opposite direction they are fixed rigidly to the shaft by a pawl and ratchet or other suitable device. The reel-shaft E is hung in hinged boxes *c c*, hinged for the purpose of readily removing the reel for coverting the machine from a hay-maker to a horse-rake. These boxes *c c* are attached rigidly to the upper end of levers *e e*, which have their fulcra on the inside of the frame A A. These levers being of a suitable length, their lower ends are connected to swinging arms *b b*, projecting down from a rod, J, by rods *f f*.

*g* is a hand-lever fixed to the rod J, and passing up by the side of the driver's seat, for operating the reel so as to raise or depress it, which operation relieves the friction-wheels G G from the projecting rim or tire of the driving-wheels and stops the rotary motion of the reel, or brings the friction-wheels in contact with the inside surface of said rim or tire.

On either side of the hand-lever *g* are pawls *h h*, which engage with racks *i i* and fix the reel in any position that it may be set, either when elevated or depressed.

The manner of hanging my revolving rakes is peculiar to any machine of this class before known, and the application of friction-wheels for giving motion to the reel for a hay-maker possesses advantages which have never yet been attained, and without which a machine for making hay will not succeed in its practical operation. This fact has been established by a long series of experiments, in which the cogged gearing and pulleys and cords were tried in various ways; but the peculiar character of the hay-making machines and the objects which they are required to perform render cogged gearing totally inefficient and inoperative, require that the machine should be very heavy in order to obtain the necessary amount of traction for the driving-wheels, and require cumbersome and complex machinery to provide for the several motions of the reel, such as raising and lowering it suddenly and throwing it in and out of gear with the driving-wheels. All this mechanism renders the machine liable to derangement, and therefore unfit for the farmer; but the greatest objections to cogged wheels are that in hay-making machines the grass or hay is thrown about in every direction and gets entangled among the gearing, and the result is the breaking of the machine or the motion of the reel is stopped. Besides, the velocity of the reel in these machines, which is very great, being suddenly stopped in case the rake-teeth should come in contact with an obstruction, and the momentum of the reel being very great, its weight being some one one hundred and fifty to one hundred and eighty pounds, teeth are readily broken and the machine rendered unfit for further use.

There are many serious objections to the use of gearing in hay-making machines which are all obviated by the use and application of friction-wheels placed on the ends of the reel-shaft and operated by the friction bands or rims of the carriage-wheels, and the shaft of the reel being hung on the ends of the levers, as before described, and the axis of the shaft being brought above that of the driving-wheels, the entire weight of the reel is thrown upon the surface of the friction-wheels and the rims of the driving-wheels, so that when the teeth of the rakes strike an obstruction the entire wheel is suddenly elevated and returns to its original position again after the object is passed—a desideratum never before automatically attained in a hay-maker.

It will be obvious, also, that by the application of friction-wheels for communicating motion to the reel a greater velocity can be given to the reel than where gearing is used, without liability of the parts breaking, as the friction-wheels will slip on the rims if the tines of the rake strike an object which would be liable to break them, and at the same time the rakes will be elevated over the object, as before mentioned.

Another advantage gained in my machine is that the teeth that elevate and scatter the hay are so attached to their bars that they may be set at various angles and brought entirely within the reel-heads when they are not to be used, the bars to which the teeth are attached may all be moved instantaneously, and the points of the teeth may be set nearer to the axis of the reel-shaft or farther from it, according to the weight of hay on the ground, whether it be wet or dry.

For adjusting the teeth of the rakes, I place on one end of each bar N a half-spurred pinion-wheel, *n*, the bars all having their bearings in the circular ends or heads D D of the reel, as clearly shown in the drawings, the teeth of which engage with spurs projecting from an adjustable spurred ring, P, which is hung in suitable guides on the outside of one of the reel-heads D, and fixed to said reel-head by set-screws *p p*, which pass through slots in the reel-head D. Now, by loosening these screws the rakes can be adjusted simultaneously, so as to entirely or partially open or close the tines, as clearly illustrated by Fig. 3 of the drawings. By these means the bars N may all be moved simultaneously.

Having thus described my improved machine for making hay, what I claim as new, and desire to secure by Letters Patent, is—

1. The rake-head shaft, furnished with friction wheels or rollers which are arranged on pivoted lever-bearings, in combination with driving-wheels which are furnished with a plain flange for the friction-rollers to act against, so that the necessary friction may be produced either by means of the specified lever arrangement or by the same in combination with the gravity of the rake-head, substantially as and for the purpose set forth.

2. Arranging or setting the bars N in the heads D D in such a manner that the teeth may be adjusted and given any desired angle by the mechanism and essentially in the manner herein describd.

J. C. STODDARD.

Witnesses:
P. EMORY ALDRICH,
WM. G. STRONG.